United States Patent [19]

Larson

[11] 3,834,422

[45] Sept. 10, 1974

[54] SEWER REPAIR APPARATUS

[75] Inventor: Richard E. Larson, Minnetonka, Minn.

[73] Assignee: Cherne Industrial, Inc., Edina, Minn.

[22] Filed: Jan. 19, 1973

[21] Appl. No.: 325,020

[52] U.S. Cl.................................. 138/97, 138/93
[51] Int. Cl............................................ F16l 55/18
[58] Field of Search.......................... 138/90, 93, 97

[56] References Cited
UNITED STATES PATENTS

| | | | |
|---|---|---|---|
| 3,103,235 | 9/1963 | Stringham............................ | 138/97 |
| 3,168,908 | 2/1965 | Zurbrigen et al. .............. | 138/97 |
| 3,267,967 | 8/1966 | Guthrie.................. | 138/97 |
| 3,269,421 | 8/1966 | Telford et al......................... | 138/97 |
| 3,618,639 | 11/1971 | Daley et al............................ | 138/97 |

*Primary Examiner*—Charles A. Ruehl
*Attorney, Agent, or Firm*—Dorsey, Marquart, Windhorst, West & Halladay

[57] ABSTRACT

A sewer repair apparatus for internally repairing leaks in sewer pipes and the like which includes a single grouting sleeve adapted for engagement with the inside surface of the pipe to be repaired, means for selectively expanding portions of the grouting sleeve to define a grouting chamber and to force grouting material into the portion of the pipe which leaks and means for introducing grouting material into said grouting chamber.

13 Claims, 5 Drawing Figures

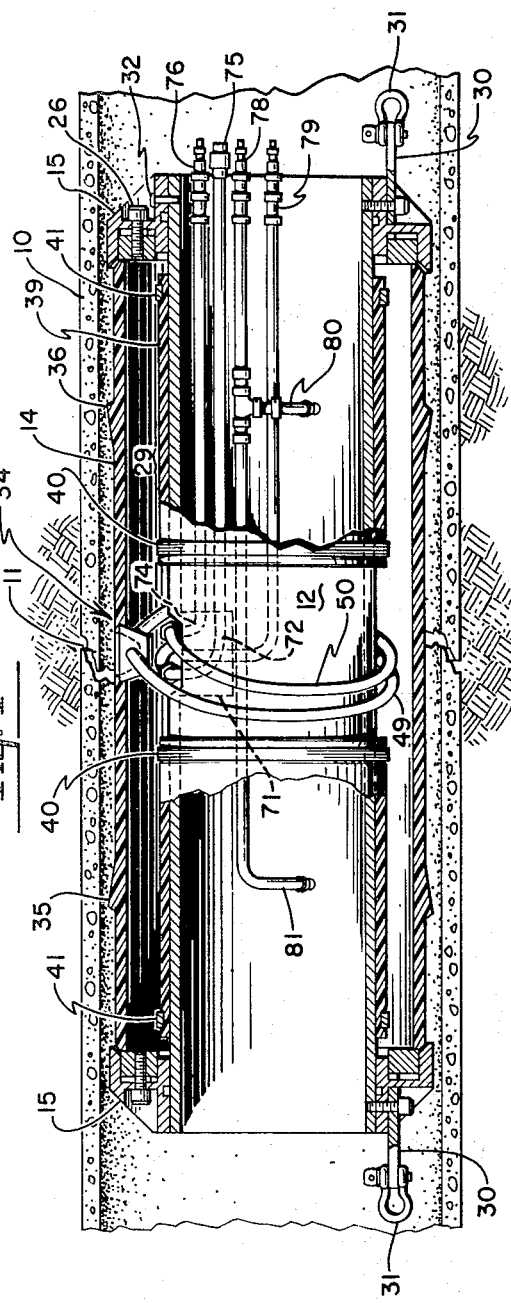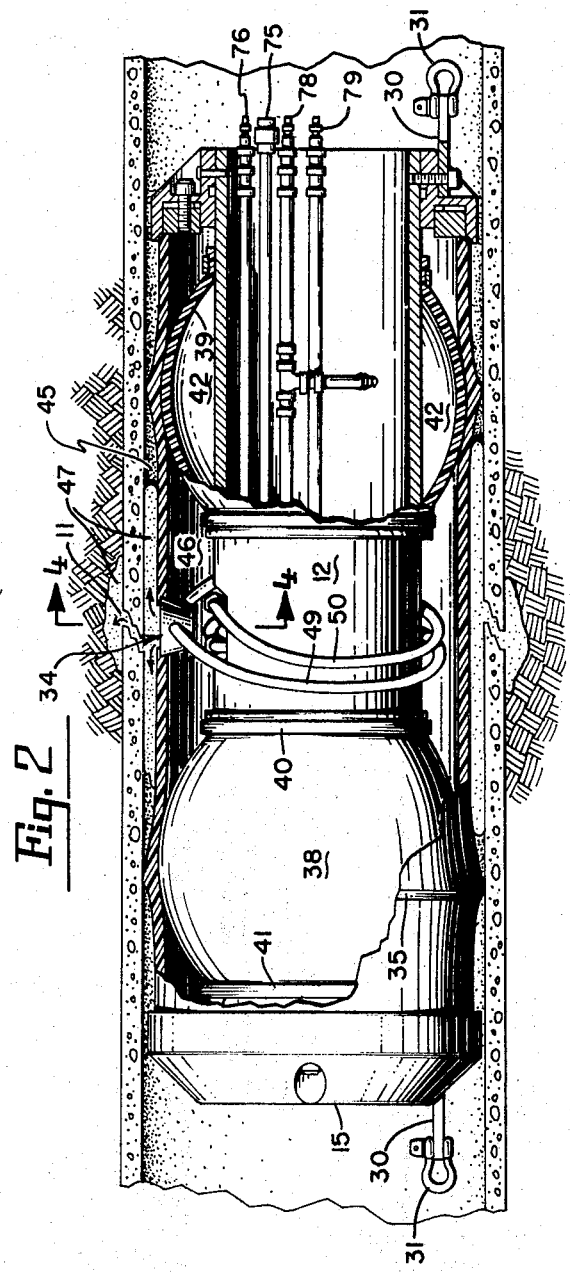

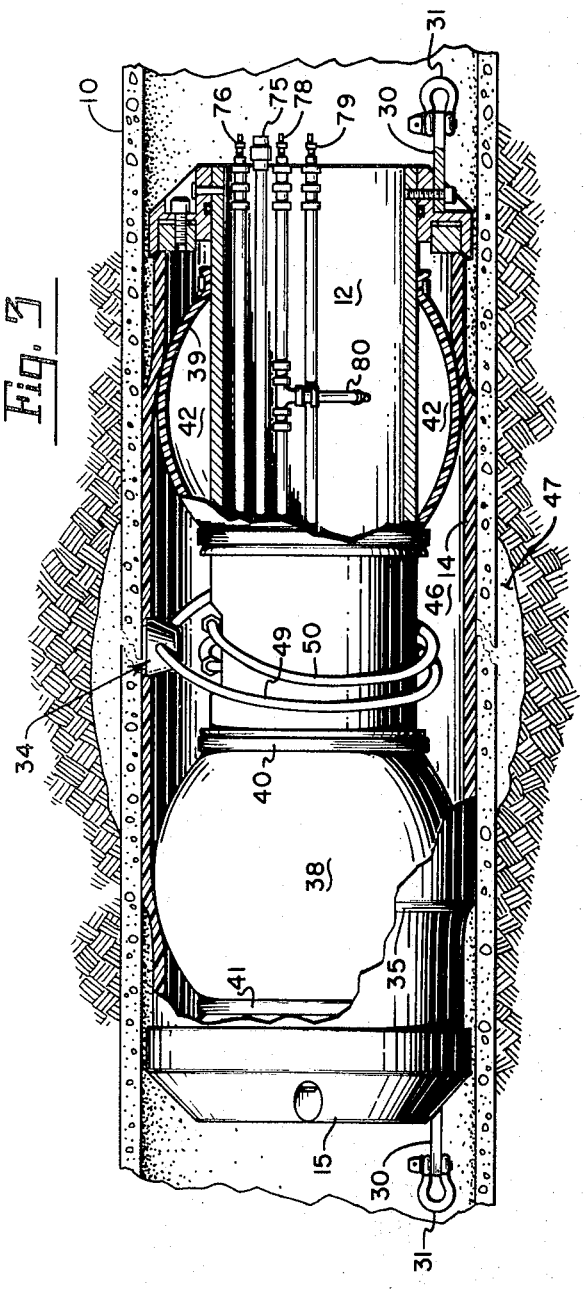
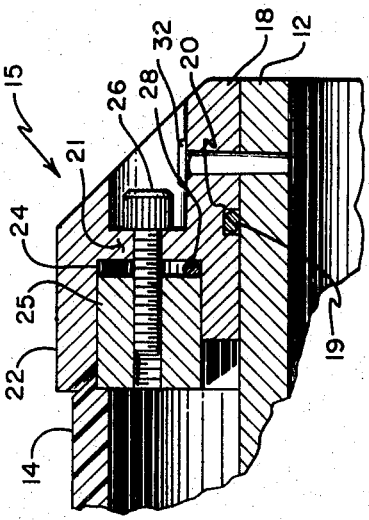
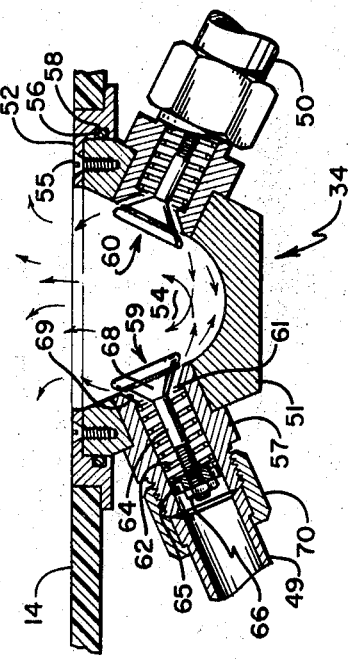

SEWER REPAIR APPARATUS

BACKGROUND AND SUMMARY OF THE INVENTION

The present invention relates generally to an apparatus for internally repairing cracks in or leaks between adjacent sections of a sewer pipe.

During the normal function of a sewer pipe, leaks often develop in the pipe wall or at the joints between adjacent sections of pipe. Prior to the present invention, one way of repairing such leaks involved drilling down to the portion of the pipe containing the leak and filling the crack or the joint with material such as cement from the exterior of the pipe. This procedure, however, was quite expensive and time consuming. Another method of repairing such leaks involved insertion of the repair apparatus inside the pipe to repair the pipe internally. Although the latter pipe repair apparatus was similar to the present invention in that it repaired leaks internally, it had several disadvantages. First, it had several inflatable bladders engaging the inside surface of the pipe. This necessarily caused the creation of grouting rings which remained in the sewer pipe following repair of the pipe. Secondly, this prior apparatus did not provide for final mixing of the grouting composition at the grouting chamber, but rather, at a point prior to introduction into the grouting chamber. This made it necessary to periodically flush the conduit conducting the mixed grouting composition to the grouting chamber in order to prevent such material from setting and solidifying in the conduit. Thirdly, because of the several bladders used, some of the grouting material seeped into the space between the bladders during operation, thus making it necessary to periodically clean the apparatus to prevent the grouting composition from solidifying in this area.

In contrast to the prior art devices, the apparatus of the present invention contemplates the use of a single grouting sleeve adapted for engagement with the inside wall of the pipe. This grouting sleeve is mounted to a centrally disposed support member and is selectively expandable at various points along the sleeve to form the grouting chamber and to force the grouting material into the area of the pipe needing repair. Further, the present invention provides for final mixing of the grouting material in the grouting chamber, thereby eliminating the need for periodic flushing of the grouting material conduits.

Accordingly, an object of the present invention is to provide an internal sewer repair apparatus with a single inflatable sleeve engaging the inside wall of the pipe.

Another object of the present invention is to provide an internal sewer repair apparatus in which the grouting composition is finally mixed in the grouting chamber.

A further object of the present invention is to provide an internal sewer repair apparatus with a single cylindrical grouting sleeve in which said grouting sleeve is selectively expandable along the length of said sleeve to define a grouting chamber and to force the grouting material into the area of the pipe to be repaired.

These and other objects of the present invention will become apparent with reference to the description of the preferred embodiment, the drawings and the appended claims.

DESCRIPTION OF THE DRAWINGS

FIG. 1 is a partial cross-sectional view of the apparatus of the present invention as it is disposed within the pipe to be repaired.

FIG. 2 is a partial cross-sectional view similar to that of FIG. 1 showing the grouting sleeve partially inflated.

FIG. 3 is a partial cross-sectional view similar to FIGS. 1 and 2 showing the grouting sleeve completely inflated.

FIG. 4 is a plan view partially in section of the means for mixing and introducing grouting material into the grouting chamber.

FIG. 5 is a sectional view of a portion of the end of the central support member showing the connection between the grouting sleeve and the support member.

DESCRIPTION OF THE PREFERRED EMBODIMENT

The sewer repair apparatus of the present invention will be first described with reference to FIGS. 1–3, all of which are side views, partially in section, of the sewer repair apparatus disposed within a length of pipe 10 which is to be repaired. As will be discussed more fully below, each of FIGS. 1–3 shows the repair apparatus in a different stage of operation.

The repair apparatus of the present invention is intended to seal or repair a pipe such as a sewer pipe 10 which may develop leaks at the joints between adjacent sections of the pipe or may form a leak intermediate between the ends of a single section such as the crack 11 illustrated in FIGS. 1–3. The repair apparatus is designed to be positioned within the pipe 10 for repairing leaks such as the crack 11 from the inside and comprises a centrally disposed support member 12, a flexible grouting sleeve 14 supported by the ends of the support member 12, expansion means for urging the grouting sleeve 14 outwardly against the inside surface of the pipe 10 and a means for introducing grouting material into a grouting chamber formed between the inside surface of the pipe 10 and the outer surface of the grouting sleeve 14.

More specifically, the centrally disposed support member or bypass tube 12 is a generally cylindrical, rigidly constructed, hollow member extending the entire length of the repair apparatus and serving primarily as a support for the other components of the repair apparatus. Although the support member 12 may be constructed from a variety of materials, the member 12 of the preferred embodiment is constructed from aluminum.

Disposed at each end of the support member 12 is an end cone 15 slidably fitting over the ends of the member 12 and designed primarily for supporting the grouting sleeve 14 and for serving as runners to slide the apparatus through the pipe 10. As illustrated more specifically in FIG. 5, each of the end cones 15 includes an annular-shaped, hollow base portion 18 having an inner cylindrical surface with dimensions approximating the outer cylindrical dimensions of the member 12, thereby permitting the base portion 18 to slidably fit over the ends of the member 12. Although the tolerances between the inner cylindrical dimensions of the portion 18 and the outer cylindrical dimensions of the member 12 are sufficient to permit such a sliding arrangement, the two surfaces are sealed by a conventional O-ring 19 disposed in an appropriate O-ring groove 20 formed within the base portion 18. It should be noted that each of the end cones 15 is secured to the support member 12 and prevented from longitudinal movement with respect to the member 12 by a plurality of pins 32 wedged through the base portion 18 of the cones 15 and into the member 12.

Integrally formed with the base 18 and extending radially outwardly therefrom is an intermediate portion 21 serving to support an annular-shaped cantilever portion 22. The intermediate portion 21, together with the inner cylindrical surface of the cantilevered portion 22 and a portion of the outer cylindrical surface of the base 18, defines an annular groove 24 opening toward the center of the member 12. An annular-shaped casting 25 having dimensions approximating the dimensions of the annular groove 24 is designed to slidably fit within the groove 24 as illustrated. The casting 25 is secured to the end cone 15 by a plurality of machine bolts 26 positioned about the periphery of the cone 15 and extending through the intermediate section 21 and threadedly received by the casting 25. A conventional O-ring 28 is disposed between the intermediate portion 21 and the casting 25 to seal the connection therebetween.

As illustrated in FIGS. 1, 2, 3 and 5, one end of the cylindrically-shaped grouting sleeve 14 is bonded to an inner surface of each of the castings 25. This bonding is such that it prevents air from escaping between the casting 25 and the sleeve 14. Due to the bonding between the sleeve 14 and the castings 25 and the O-rings 19 and 28, an air-tight chamber 29 (FIG. 1) is formed between the inner surface of the grouting sleeve 14 and the outer surface of the aluminum support member 12.

A towing bar 30 is connected to each of the end cones 15, 15 and thus to the support member 12 by an appropriate connecting means. Each of the towing bars 30 includes a clevis arrangement 31 at its end to permit a cable or other towing means (not shown) to be connected to the sewer repair apparatus in order to move the apparatus through the sewer pipe 10 and into position for repair.

Referring again to FIGS. 1, 2 and 3, the flexible grouting sleeve 14 is an elongated annular-shaped member having an inner cylindrical surface and an outer cylindrical surface extending between the end cones 15, 15. The ends of the grouting sleeve 14, as previously mentioned, are bonded in an airtight arrangement, to an inner surface of the annular castings 25 disposed at each end of the sleeve 14. Positioned near the center of the sleeve 14 is a bulkhead arrangement 34, which will be described in more detail below, adapted for introducing grouting material into the area between the outer cylindrical surface of the sleeve 14 and the inner cylindrical surface of the pipe 10. Intermediate between the center of the sleeve 14 where the bulkhead 34 is disposed and each of the ends of the sleeve 14 is a rib 35 and 36 extending about the periphery of the sleeve 14 and radially outwardly therefrom. As will be explained further below, each of these ribs 35 and 36, in response to pressure against the inside surface of the sleeve 14 is caused to engage the inside surface of the pipe 10 in the manner illustrated in FIG. 2 to form a grouting chamber 45 between the inside surface of the pipe 10 and the outer surface of the sleeve 14 and between the ribs 35 and 36. Although the grouting sleeve 14 may be composed of a variety of materials, the preferred structure is composed of an elastomeric material to which the grouting material being used will not stick.

Associated with the member 12 is a pair of spaced first expansion means in the form of first and second inflatable bladders 38 and 39 for selectively expanding spaced portions of the grouting sleeve 14 into engagement with the inside wall of the pipeline. The bladders 38 and 39 are connected to the exterior surface of the support member 12 to form therebetween, when inflated, first and second air chambers 42 (FIGS. 2 and 3). As illustrated, one of the bladders 38 and 39 is disposed between one of the end cones 15 and the center of the member 12 while the other of the bladders 38 and 39 is disposed between the other cone 15 and the center of the member 12. Each of the bladders 38 and 39 when not inflated is an annular member with dimensions enabling it to slide over the outer cylindrical surface of the member 12. The bladders 38 and 39 are secured to the outer surface of the member 12 near the ends of the bladders by a pair of conventional band clamps 40 and 41. The clamps 40 and 41 are tightened to such an extent that the ends of the bladders 38 and 39 are tightly secured to the member 12 to form an airtight chamber between the inner surface of the bladders 38 and 39 and the outer surface of the member 12. In the preferred embodiment, the bladders 38 and 39 are composed of natural rubber having a durometer of about 60 and being about ¼ inch thick.

The primary function of the bladders 38 and 39 is to cause the grouting sleeve 14 to expand and thereby move radially outwardly so that the ribs 35 and 36 engage the inner cylindrical surface of the sewer pipe 10. This is accomplished by introducing compressed air into the chambers 42 formed between the bladders 38, 39 and the member 12. The introduction of air into these chambers is accomplished and controlled by means which will be discussed later in the specification. As the bladders 38 and 39 are inflated, the outer surface of the bladders engages the inner surface of the sleeve 14 to thereby force the ribs 35 and 36 against the inner surface of the pipe 10 to form a grouting chamber 45 between the grouting sleeve 14 and the inside wall of said pipeline and between the points of engagement of the spaced portions of the grouting sleeve 14. A second expansion means, separate from the first expansion means, for selectively expanding the portion of the grouting sleeve 14 defining the grouting chamber 45 is best illustrated in FIG. 2 in the form of the third air chamber 46 formed between the inner surface of the sleeve 14, the outer surface of the center portion of the member 12 and the outer surfaces of the inflated bladders 38 and 39. As will be discussed below, this chamber 46, upon the introduction of compressed air, will expand thus urging the center portion of the grouting sleeve 14 outwardly toward the pipe 10.

Located near the center of the grouting sleeve 14 is a means for introducing grouting material into the grouting chamber 45 (FIG. 2). This means includes a bulkhead member 34 connected with the grouting sleeve 14 in an air-tight manner and a pair of flexible conduits 49 and 50 for delivering the components of the grouting composition to the bulkhead 34. As illustrated best in FIG. 4, the bulkhead 34 includes a frustum-shaped member 51 whose interior surface defines a mixing chamber 54 and which is connected to the grouting sleeve 14 via a connecting ring 52 in the manner illustrated. The member 51 is connected to the ring 52 by a plurality of flathead machine screws 55 extending through the ring 52 and into the member 51. The ring 52 in turn is connected to the sleeve 14 as a result of bonding the sleeve 14 to a shoulder portion of the ring 52. An O-ring groove 58 is formed around an inner surface of the ring 52 for receiving a conventional O-ring 56. The O-ring 56 is disposed within the groove 58 with a portion engaging the outer surface of the member 51 to form an airtight seal and prevent the passage of air between the chamber 46 and the grouting chamber 45 (FIG. 2).

A pair of poppet valves 59 and 60 are threadedly connected with the member 51 for controlling the introduction of grouting material into the mixing chamber 54. Each of the valves 59 and 60 includes an annular-shaped sleeve portion 57 being threaded at one end for connection with the member 51 and being threaded at the other end for connection to one of the flexible conduits 49 and 50. A shoulder 61 is formed on the interior of each of the sleeves 57 near its forward end to support a conventional compression spring 62 disposed therein and adapted for urging an elongated valve stem 64 toward a closed position. Disposed at one end of the stem 64 is a thrust member 65 engaging one end of the spring 62 and a retaining nut 66 threadedly connected to the lower end of the stem 64 for retaining the thrust member 65. As is evident, the force which the spring 62 exerts on the member 65 and thus on the stem 64 can be adjusted by correspondingly adjusting the threaded position of the nut 66. The forward end of the stem 64 includes a conically shaped portion 68 having a rubber gasket adapted for engagement with a valve seat 69 formed at the forward end of the sleeve 57. The flexible conduits 49 and 50 are connected with the rearward end of the sleeves 57 by a conventional fitting 70.

Because of the presence of the compression spring 62, the valves 59 and 60 are normally urged toward a closed position in which the rubber gasket engages the valve seat 69. However, when the components of the grouting composition are forced through the conduits 49 and 50, under pressure, the force of the spring 62 is overcome and the valves 59 and 60 move to an open position to allow the material to be introduced into the mixing chamber 54, and eventually into the grouting chamber 45 (FIG. 2) through the space between the rubber gasket and the seat 69.

Referring again to FIGS. 1-3, it can be seen that the flexible conduits 49 and 50 extend from the bulkhead 34, around the support member 12 and into a manifold 71 integrally formed with the member 12. As indicated by the broken lines 72 and 74 in the manifold 71, the passageways of the conduits 49 and 50 are connected to a pair of tubular members 75 and 76 which extend from the manifold 71 toward the end of the member 12 to be connected by appropriate means to a grouting component source.

Also housed within the support member 12 is a pair of conduits 78 and 79 for supplying compressed air to the bladder chambers 42 and to the air chamber 46 respectively. As indicated, the conduit 79 passes into the manifold 71 where the passageway is allowed exit into the chamber 46. The conduit 78 is provided with appropriate fittings 80 and 81 for directing the compressed air into the bladder air chambers 42.

With general reference to FIGS. 1, 2 and 3, the operation of the sewer repair apparatus of the present invention may be explained as follows: First of all, the leak in the pipe is detected through the use of a television camera or other conventional means. Then the sewer repair apparatus is positioned within the pipe 10 via the towing bar 30 and a conventional towing means so that the bulkhead 34 is directly aligned with the crack 11 in the pipe 10 as illustrated in FIG. 1. When the apparatus is in this position, compressed air is introduced into the conduit 78 and thus into the chambers 42 within the bladders 38 and 39. This causes the bladders 38 and 39 to be inflated and thereby causes the ribs 35 and 36 to be urged into engagement with the inner surface of the pipe 10 as illustrated in FIG. 2. Such inflation is continued until the ribs 35 and 36 engage the pipe 10 with sufficient pressure to prevent grouting material 47 from escaping when it is introduced into the chamber 45. Following this, two components of the grouting composition are introduced into the mixing chamber 54 of the bulkhead 34 (FIG. 4) through the conduits 75, 76, 49 and 50 and through the poppet valves 59 and 60 (FIG. 4). When introduced into the chamber 54, the two components of the grouting composition are thoroughly mixed because of their turbulent entry into the chamber 54 and the shape of the chamber 54. After being thoroughly mixed, the resulting composition overflows from the chamber 54 into the grouting chamber 45 in a manner illustrated in FIG. 2. As can be seen, after sufficient grouting material 47 has been introduced, a portion of the material begins to flow into the crack 11.

When the introduction of the grouting composition is complete, the passage of grouting material through the conduits 75 and 76 is stopped and the poppet valves 59 and 60 (FIG. 4) are automatically closed by the pressure of the springs 62. Following this, compressed air is introduced into the chamber 46 (FIGS. 2 and 3) via the conduit 79, thereby urging the grouting sleeve 14 radially outwardly to the position shown in FIG. 3. The inflation of the chamber 46 causes the grouting composition 47 originally in the chamber 45 to be forced out through the crack 11 and into the area immediately outside of the pipe 10 as illustrated in FIG. 3. When the chamber 46 is completely inflated, the apparatus is allowed to remain in this position until the grouting material has solidified. When the grouting material has sufficiently solidified, the chamber 46 and the bladders 38 and 39 are deflated so that the apparatus again assumes the position shown in FIG. 1. The apparatus is then ready to be moved on to the next leak.

It should be noted that although a variety of grouting compositions may be used, the composition intended to be used by the preferred embodiment is such that it is inactive until the two components of the composition are combined and thoroughly mixed. Consequently, the composition does not begin to react until the two components are combined in the mixing chamber 54. Further, it should be noted that the flexible conduits 49 and 50 are sufficient in length to enable the bulkhead 34 to be moved, together with the grouting sleeve, from the position shown in FIG. 2 to the position shown in FIG. 3.

Although the description of the preferred embodiment has been quite specific, it is contemplated that various modifications could be made to the apparatus without deviating from the spirit of the present invention. Consequently, it is the intention of the applicant that the scope of the present invention be dictated by the appended claims rather than by the description of the preferred embodiment.

I claim:

1. An apparatus for internally repairing a pipeline having an inside wall comprising:
    an elongated, centrally disposed support member having a diameter less than the interior diameter of said pipeline;
    a single, annular, flexible grouting sleeve disposed about and spaced outwardly from said support member and supported at its ends by said support member;
    a pair of spaced, first expansion means for selectively expanding spaced portions of said grouting sleeve into engagement with the inside wall of said pipeline to define a grouting chamber between said grouting sleeve and the inside wall of said pipeline and between the points of engagement of said spaced portions of said grouting sleeve;
    means for introducing grouting material into said grouting chamber; and
    second expansion means separate from said first expansion means for expanding the portion of said grouting sleeve disposed between the points of engagement of said spaced portions of said grouting sleeve with the inside wall of said pipeline toward engagement with the inside wall of said pipeline.

2. The apparatus of claim 1 wherein said pair of spaced expansion members includes a pair of bladders forming first and second air chambers.

3. The apparatus of claim 2 wherein said second expansion means is a third air chamber formed between said first and second air chambers.

4. The apparatus of claim 3 wherein said third air chamber is defined by the exterior surface of said bladders when expanded and the portions of said grouting sleeve and said support member located therebetween.

5. The apparatus of claim 4 having means for selectively introducing compressed air into each of said first, second and third air chambers.

6. The apparatus of claim 5 wherein said support member is an annular shaped member constructed of a relatively rigid material having an end member disposed at each end for supporting said grouting sleeve.

7. The apparatus of claim 6 wherein the connection between said grouting sleeve and said support member is such that an airtight space is formed therebetween.

8. The apparatus of claim 7 wherein each of said bladders comprises an annular shaped member composed of a flexible material which is secured to said support member by a pair of band clamps to form one of said first and second air chambers between the inner annular surface of the bladder and the outer annular surface of said support member.

9. The apparatus of claim 1 wherein said means for introducing grouting material into said grouting chamber includes a bulkhead member formed in said grouting sleeve.

10. The apparatus of claim 9 wherein said bulkhead member defines a mixing chamber with said mixing chamber being in communication with said grouting chamber.

11. The apparatus of claim 10 having a plurality of flexible conduits for supplying components of the grouting material to said mixing chamber.

12. The apparatus of claim 11 wherein said flexible conduits are of sufficient length to permit the expansion and retraction of said grouting sleeve.

13. The apparatus of claim 1 wherein said grouting sleeve includes a pair of ribs integrally formed with said sleeve and disposed about the periphery thereof for engagement with the inside wall of said pipeline, said ribs being spaced to define said grouting chamber.

* * * * *